July 23, 1963    H. M. DODGE ET AL    3,098,406
PERFORATION OF SHEET MATERIAL
Filed April 2, 1958    5 Sheets-Sheet 2
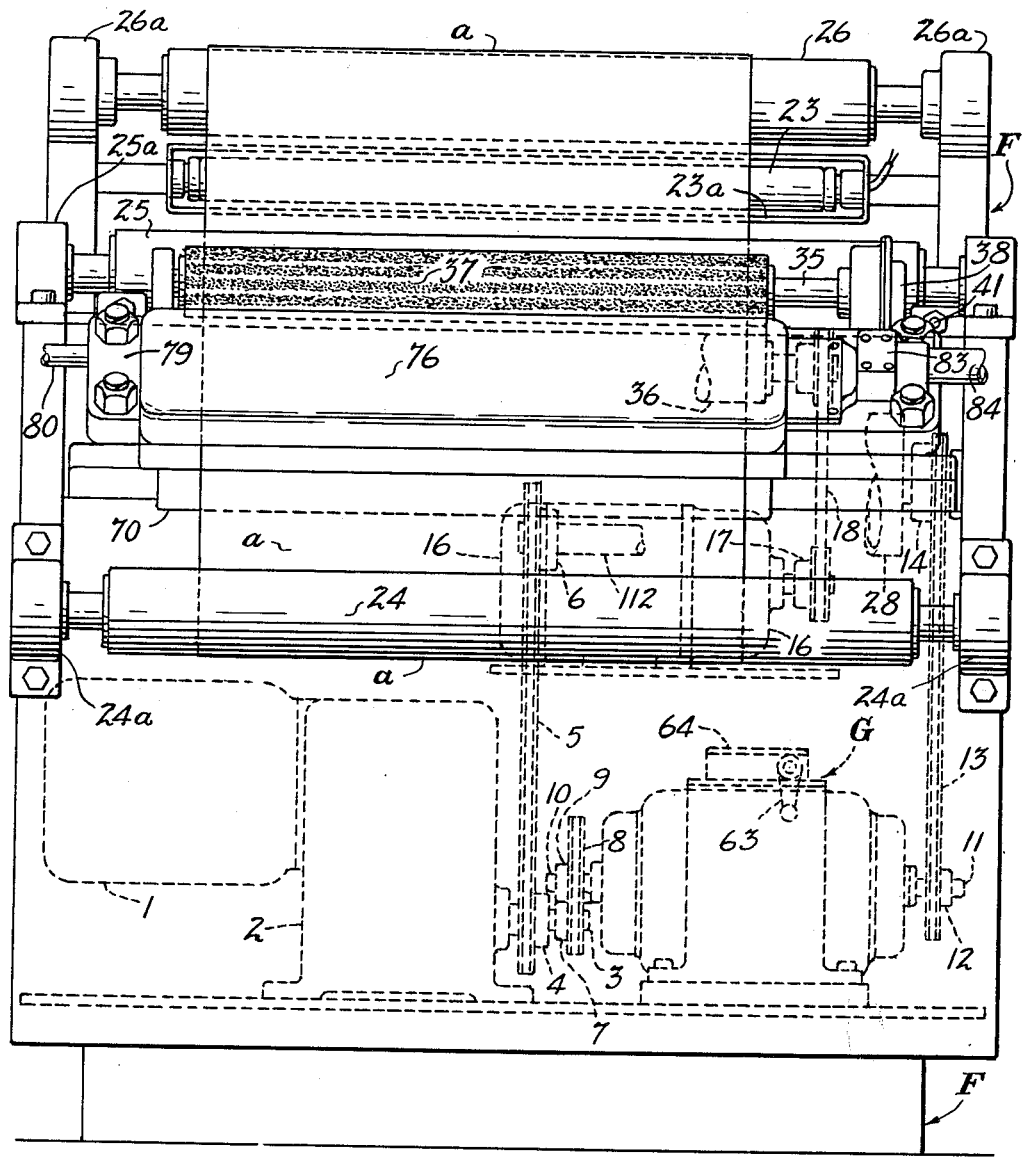
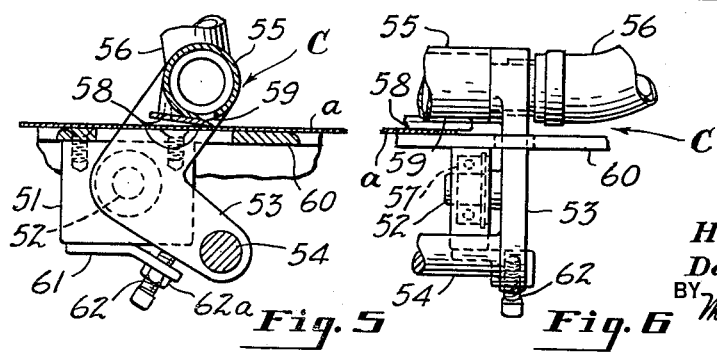
Fig. 4
Fig. 5
Fig. 6
INVENTORS
Howard M. Dodge
Daniel P. Reynolds
BY
ATTORNEYS

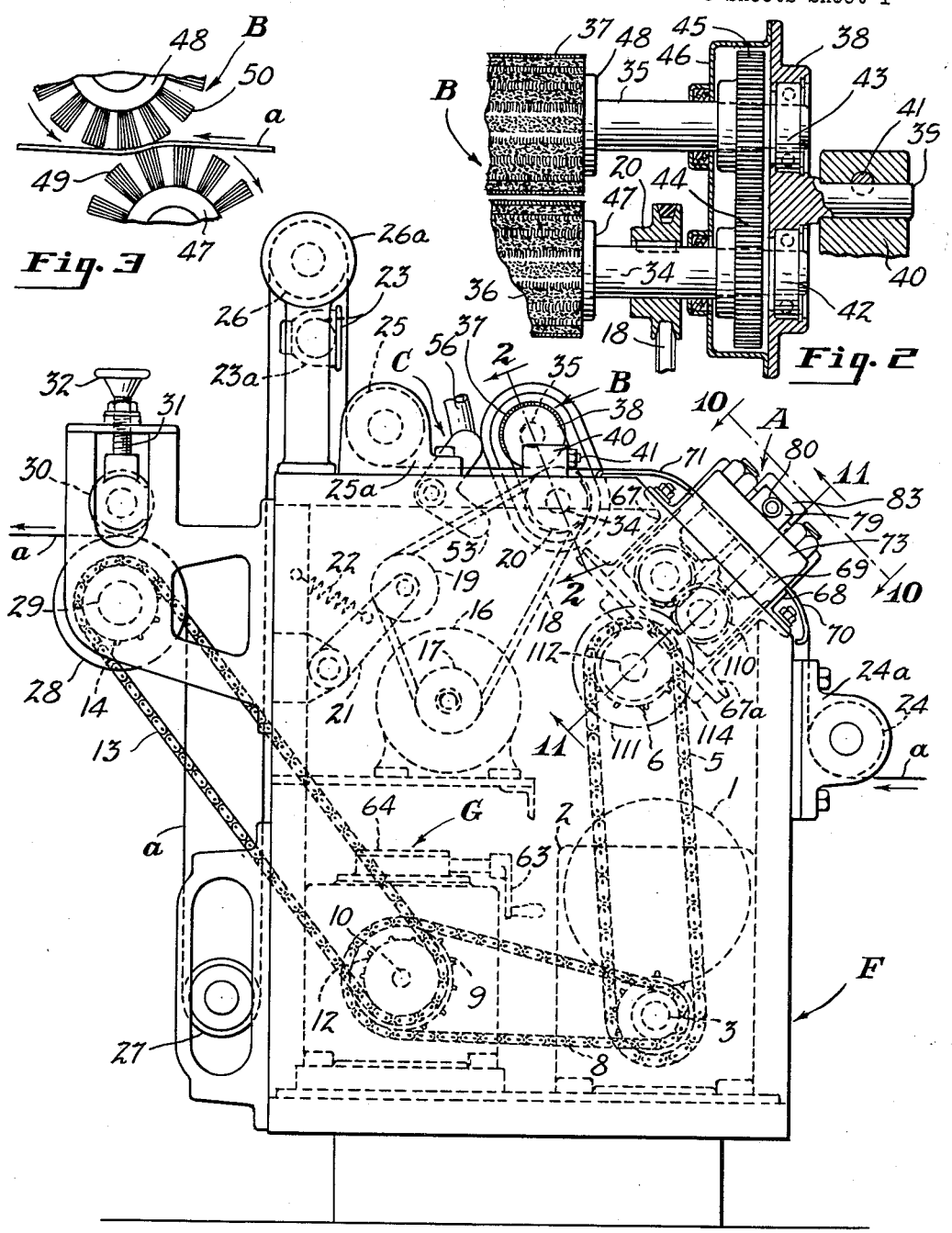

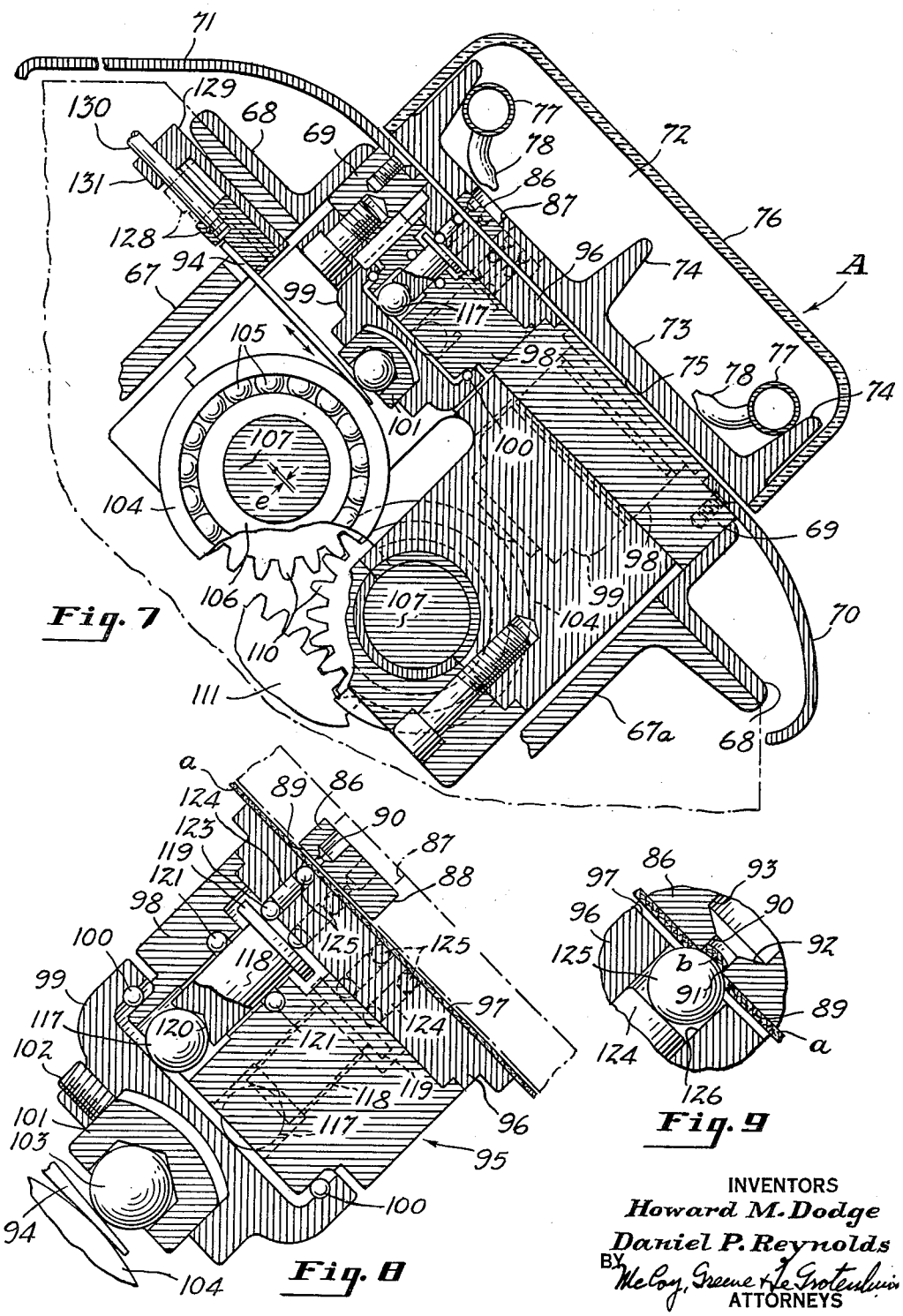

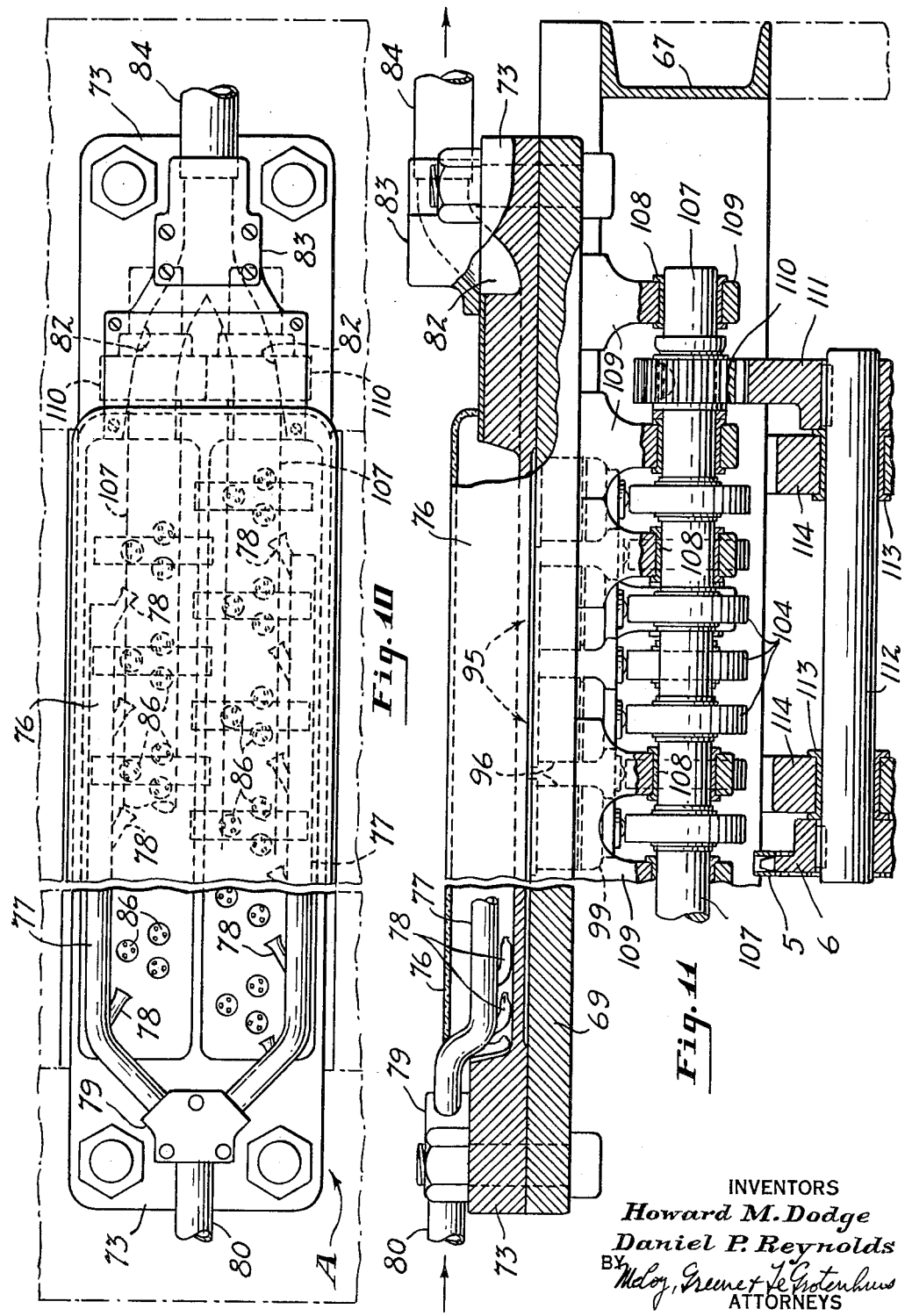

July 23, 1963  H. M. DODGE ET AL  3,098,406
PERFORATION OF SHEET MATERIAL

Filed April 2, 1958  5 Sheets-Sheet 5

INVENTORS
Howard M. Dodge
Daniel P. Reynolds
ATTORNEYS

United States Patent Office 3,098,406
Patented July 23, 1963

3,098,406
PERFORATION OF SHEET MATERIAL
Howard M. Dodge, Wabash, Ind., and Daniel P. Reynolds, Canton, Ohio, assignors to The General Tire & Rubber Company, Akron, Ohio, a corporation of Ohio
Filed Apr. 2, 1958, Ser. No. 725,864
2 Claims. (Cl. 83—588)

The present invention relates to an apparatus for perforating sheet material and more particularly to the use of spherical balls or other rounded sheet-engaging elements for perforating plastic sheet material.

Heretofore, considerable difficulty has been experienced in perforating machines for plastic materials because of the excessive wear of the punches where they entered the die openings and the excessive breakage of the punches. This wear could be reduced by various measures, for example, by avoiding excessive vibration, by slowing down the rate of feed of the sheet material, by maintaining the punches in accurate alignment with the die openings at all times, or by employing hard materials which were brittle and apt to break. Such measures were costly and time consuming and usually slowed down the rate of production so that the perforating operation was unduly expensive even on a large scale.

The present invention overcomes the prior difficulties by replacing the conventional punch with a perforating element which squeezes or pinches off the sheet material instead of shearing the material in the conventional manner. The perforating element has a projecting sheet-engaging surface that provides a work-engaging surface portion surrounding its terminus that recedes from said terminus, said sheet-engaging surface being preferably a rounded smooth convex surface which pinches the material against a die or other hard surface at a zone surrounding said terminus. The hard surface against which the perforating element is pressed is preferably the marginal edge of a die opening whose dimensions are smaller than those of said sheet-engaging surface. According to the preferred method a ball, having a diameter greater than that of the die opening, is forced into and out of engagement with the marginal edge of the die opening to perforate the sheet material as it is fed through the machine. The ball is preferably permitted to rotate to reduce drag on the material feed and to minimize wear on the ball and on the marginal edge of the die. The rotation of the ball permits a reduction in the magnitude of the punch stroke so that it is not substantially greater than the thickness of the material and reduces the change in momentum and the period of time required for the punch strokes, whereby very high speed operation (i.e., more than 1,000 cycles per minute) is possible.

An object of the invention is to provide an inexpensive perforating machine which may be operated for long periods of time at high speeds without replacement parts.

Another object of the invention is to provide simple inexpensive perforating means which do not break or wear out when employed in a high speed perforating machine subject to substantial vibration.

A still further object of the invention is to provide a commercially practical perforating machine which can mass-produce perforated plastic sheet material at a minimum cost.

Other objects, uses and advantages of the invention will become aparent to those skilled in the art from the following description and claims and from the drawings, in which:

FIGURE 1 is a side elevational view on a reduced scale, with parts omitted, showing a perforating machine constructed according to the present invention;

FIG. 2 is a fragmentary sectional view taken substantially on the line indicated at 2—2 in FIG. 1 and on a larger scale;

FIG. 3 is a fragmentary side elevational view showing the operation of the brushes shown in FIG. 1;

FIG. 4 is an end elevational view, with parts broken away and parts omitted, of the perforating machine of FIGS. 1 to 3;

FIG. 5 is a vertical sectional view showing the scraper means for removing waste slugs from the perforated sheet material moving through the machine;

FIG. 6 is a fragmentary transverse elevational view of the apparatus shown in FIG. 5 and on the same scale;

FIG. 7 is a longitudinal vertical sectional view on a reduced scale showing the punch and die assembly of the perforating machine, the machine being shown when the sheet material is removed;

FIG. 8 is a fragmentary vertical sectional view similar to FIG. 7 but on a larger scale, the fabric sheet being shown moving between the punches and dies;

FIG. 9 is a fragmentary vertical sectional view taken through the axis of an aligned punch and die and on an enlarged scale, the parts being shown in their positions at the instant the hole is cut in the sheet;

FIG. 10 is a fragmentary plan view taken on the line 10—10 of FIG. 1 and on a larger scale with parts broken away;

FIG. 11 is a fragmentary sectional view taken substantially on the line indicated at 11—11 in FIG. 1 and on a larger scale with parts broken away and shown in section;

FIG. 12 is a plan view showing the arrangement of the punches and illustrating the amount of feed of the strip material per stroke of the punches to obtain the desired pattern;

FIG. 13 is a fragmentary vertical sectional view showing a modified form of the present invention, the parts being shown in their positions at the instant the strip material is perforated.

Figure 42:
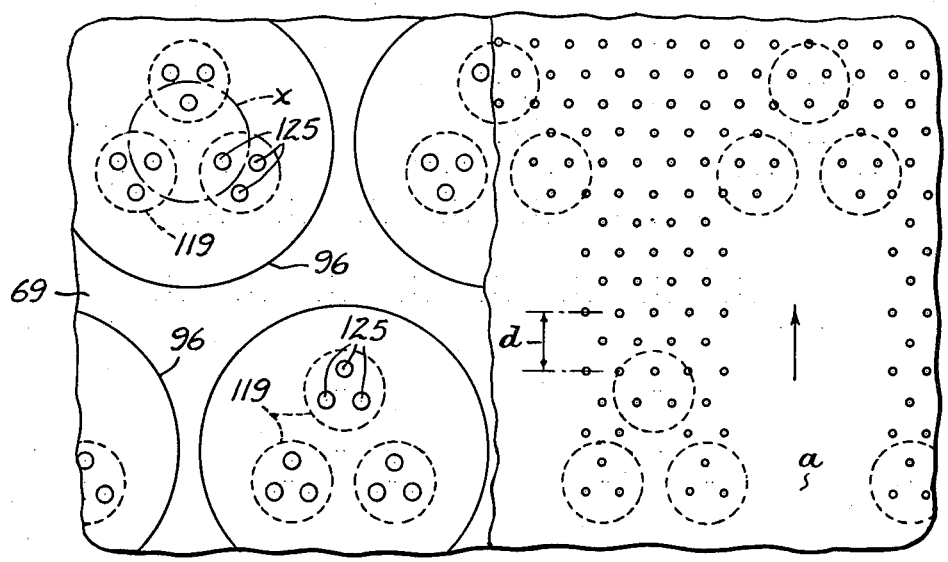
Figure 43:
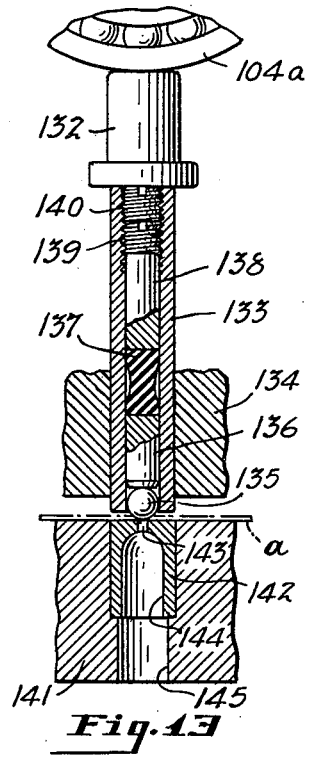

Referring more particularly to the drawings which are drawn substantially to scale and in which like parts are identified by the same numerals throughout the several views, FIGURES 1 to 11 show a perforating machine capable of perforating plastic or plastic-coated fabric material and other soft flexible sheet material at high speed so that several rolls of sheet material having a length of several hundred feet may be perforated accurately within a few hours. The perforating machine has a rigid metal frame F which provides a support and a housing for an electric motor 1, a gear reduction unit 2, and other driving elements for the machine. The motor 1 provides the needed power and causes rotation of the output shaft 3 of the gear reduction unit.

A lower sprocket 4 is rigidly mounted on the shaft 3 to receive a link chain 5 which extends upwardly over an upper pulley 6. A small sprocket 7 is also rigidly mounted on the shaft 3 and receives a link chain 8 which extends around a larger sprocket 9. The sprocket 9 is rigidly mounted on the input shaft 10 of a conventional Graham variable speed drive G, for example of the type shown in U.S. Patent No. 2,535,409. The output shaft 11 of the Graham drive is rigidly connected to a lower sprocket 12 which receives a chain 13. The chain 13 extends around an upper sprocket 14 to effect feeding of the plastic-coated fabric sheet $a$.

A gear 44 is rigidly mounted on one end of the shaft 34 and has teeth which mesh with the teeth of an identical gear 45 carried by the shaft 35. The two helical gears cause the shafts 34 and 35 to rotate at the same speed in opposite directions whenever the brushes are rotated by the motor 16. A sheet metal cover 46 may be provided to cover the gears to exclude dirt or other foreign material.

The brush rolls 36 and 37 have metal hubs 47 and 48 which are rigidly connected to the shafts 34 and 35, respectively, and have bristle sections 49 and 50, respectively, which are regularly spaced around the peripheries of the brush rolls. By loosening and tightening the locking screw 41, it is possible to adjust the positions of the brush rolls to obtain the desired pressure between the brush and the sheet material. FIGURE 3 illustrates how the brushes may be adjusted so as to provide substantial pressure against the sheet material whereby the bristles of the brush tend to project into or through the perforations formed by the punches.

Suitable means may be provided for removing all of the slugs of waste material from the perforated sheet. As herein shown, a scraper assembly C is provided having supporting brackets 51 rigidly mounted on the frame F to provide means for pivotally supporting a pair of shaft-supporting plates 53. Each of said plates has a horizontally projecting portion providing a short stub shaft or pivot shaft 52 which is pivotally mounted on the brackets 51. A cross bar 54 and a hollow scrap-receiving tube 55 extend between the two plates 53 to provide a rigid construction. An exhaust conduit 56 is connected to the open end of the tube 55 and to a vacuum pump or other source of air at sub-atmospheric pressure whereby the slugs entering the tube 55 may be removed rapidly.

The frame F also has means for supporting an electric motor 16 at a higher elevation than the motor 1. The motor 16 drives a pulley 17 which receives a V-belt 18. An idler pulley 19 and a brush-driving pulley 20 are also provided for engaging the belt 18, the idler pulley being rotatably mounted on a lever 21 which is biased in a direction away from the pulleys 17 and 20 by a tension spring 22 as best shown in FIG. 1. The lever 21 is pivotally connected to the frame F at its lower end to permit the necessary movement of the idler roller 19 whereby the proper tension is maintained in the belt 18.

The sheet material $a$ may be guided over the perforating machine in any suitable manner and may be inspected as it is moving through the machine to determine whether the machine is operating properly. As herein shown, an inspection light 23 is provided which is in the form of a long fluorescent tube extending transversely of and parallel to the moving sheet. A guard 23a surrounds the light to prevent breaking thereof.

The sheet material $a$ has a substantially uniform width and thickness and is preferably stored in rolls before and after being perforated. The sheet material may be guided from a supply roll by suitable guide rollers and may be guided through the perforating machine by guide rollers 24, 25 and 26 as shown in FIGS. 1 and 4. These guide rollers are rotatably mounted on the frame F by bearings 24a, 25a and 26a and rotate freely so as to offer minimum resistance to movement of the sheet material. A guide roller 27 is provided which is mounted for vertical movement on the frame F, the weight of this roller applying a tension to the sheet material so that it moves in an orderly manner through the machine.

Movement of the sheet material is preferably effected by feed rollers which pull the material through the machine as herein shown. A feed roller 28 is provided at the outlet end of the machine which has a shaft 29 rigidly connected to the pulley 14 so that said feed roller is driven by the motor 1. The sheet material is held in non-slip contact with the driven roller 28 by means of an idler roller 30 whose position may be adjusted by means of a screw 31 and a handle 32. As is apparent in FIG. 1, the idler roller preferably has an elastic rubber sleeve forming the outer surface so as to avoid excessive pressure between the feed rollers 28 and 30.

A brush assembly B is provided for removing the waste slugs from the holes formed in the material to improve the appearance of the perforated product. This assembly includes a lower shaft 34 and a parallel upper shaft 35 which support brush rolls 36 and 37, respectively. The opposite ends of these shafts are supported by members 38 which are shaped somewhat like a piano stool and have horizontally projecting shaft portions 39 extending outwardly beyond the ends of the shafts. The portions 39 provide stub shafts which are mounted for rotation in upwardly projecting ears 40 carried by the frame F. A locking screw 41 is provided for each of the members 38 so that the brush rolls 36 and 37 may be positioned with their axes in any desired fixed positions. The opposite ends of the shaft 34 are mounted for rotation in bearings 42 carried by the members 38 and in the opposite ends of the shaft 35 are similarly journaled for rotation in bearings 43 as best shown in FIG. 2.

A flat scraper blade 58 is rigidly mounted on the tube 55 with its pointed edge parallel to and engaging the top of the sheet $a$ so that any slugs on the sheet will be scraped off into the tube 55, a narrow slot 59 being provided which extends the full width of the sheet $a$ and the full length of the blade 58. A flat strip-supporting metal guide 60 is provided upstream of the scraper blade 58 to support the sheet $a$ at the proper position for engagement with said blade, as is apparent from FIG. 5. The shaft 52 is freely rotatable on bearings 57 carried by the brackets 51 so that the tube 55 may be easily swung about the axis of the shafts 52.

Means is provided to limit the clockwise swinging movement of the plate 53, as viewed in FIG. 5, including a bracket member 61 and an adjustable screw 62. The screw may be placed in the desired position and locked in that position by means of a nut 62a so that the tube 55 has the desired position relative to the sheet $a$. The tube 55 is free to swing in a counterclockwise direction, as viewed in FIG. 5, so as to prevent damage to the sheet $a$ by the blade 58. The weight of the tube 55 and the bar 54 tend to hold each plate 53 against its associated stop screw 62 so that the parts are normally in the position shown in FIG. 5.

The Graham drive G shown herein may be of any suitable conventional type; for example, as shown in any of the following United States patents: 2,267,034; 2,315,067; 2,405,957; 2,448,598; and 2,535,409. This drive may be provided with a speed-adjusting handle 63 and an indicator dial 64 which indicates the output speed for which the unit is adjusted.

The punch and die assembly A is rigidly supported on the frame F by means including metal channels 67 and 67a and a metal angle 68 welded to the channels. A casting 69 is rigidly connected to the angle 68 and provides a support for curved die plates 70 and 71 as best shown in FIG. 7. A die receiving block 73, having upwardly extending reinforcing ribs 74 and a flat bottom surface 75, is rigidly mounted on the casting 69. A plastic cover 76 extends over the block 73 to provide an airtight chamber 72. A pair of parallel air conduits 77 are provided in the chamber 72 and have a series of regularly spaced nozzles 78 arranged as shown in FIGS. 7 and 10. Air is supplied to the conduit 77 by suitable means including a Y-fitting 79 and an inlet conduit 80 which is connected to a blower or other source of air under pressure. The high pressure air is forced through the nozzle 78 to provide jet streams which blow scrap material away from the tops of the dies and toward the rear or exhaust end of the chamber 72.

A pair of exhaust passages 82 are provided at this end of the chamber and join at an exhaust fitting 83 which is rigidly mounted above the block 73. An outlet conduit 84 is connected to the fitting 83 and extends to a vacuum pump or other source of air at sub-atmospheric pressure. Air, therefore, flows rapidly through the chamber 72 and the outlet conduit 84 so as to remove effectively the waste slugs coming out of the dies.

A series of circular die blocks 86 are provided which are concentric with the circular holes 87 in the blocks 73. Each of the die blocks has a cylindrical outer surface 88 and a flat bottom surface 89 which is flush with the flat surface 75 of the block 73. Each die block 86 has three regularly spaced circular die openings 90 with a circular marginal cutting edge 91 located at the first flat surface 89. This cutting edge is engaged by the punch to cut the perforations in the sheet material.

Each time a cut is made as indicated in FIG. 9, a circular slug $b$ is formed. In order to facilitate removal of this slug, a tapered surface 92 is provided at the upper end of each opening 90 and extends from said opening to a larger circular opening 93 which communicates directly with the opening 87 as best shown in FIG. 8. The fast moving air within the chamber 72 causes the slugs $b$ to move rapidly out of the die blocks 86 and into the chamber 76. The slugs $b$, therefore, do not interfere with the perforating operation.

As indicated in FIG. 10, the die blocks 86 are arranged in groups of three in two rows. In each group, the centers of the three die blocks are equally spaced and located in a circle $x$ as indicated in FIG. 12. A retractable movement-transmitting finger 94 and a punch unit 95 are provided for each group of three die blocks 86 as will be apparent from FIG. 8. Each of said punch units has an upper portion 96 of circular shape with a flat top surface 97 parallel to the flat bottom surface 75 and has an intermediate body portion 98 and a lower body portion 99 which are also of circular shape, the latter portions having cylindrical outer surfaces of the same diameter so that the punch unit 95 will fit into a cylindrical opening. Ball bearings 100 are provided between the portions 98 and 99 to permit relative axial movement therebetween while holding the members in concentric relation.

A cup-shaped member 101 fits in the bottom of the member 99 and is rigidly held in the desired position by a locking screw 102. A large ball 103 fits in the member 101 and engages the top surface of the finger 94 when said finger is in its advanced movement-transmitting position shown in solid lines in FIG. 7 and 8. When the finger is in this position it engages the outer cylindrical surface of the actuating ring 104 whereby the axial movement imparted to the ball 103 imparts a cutting stroke to the punches. A series of ball bearings 105 are mounted in an inner race 106 and engage said race and the inner surface of the ring 104 which serves as an outer race for the ball bearings. Each inner race 106 is mounted on a shaft 107 which is journaled for rotation in bearings 108 carried by supports 109. Two parallel shafts 107 are provided as best shown in FIG. 7, said shafts carrying helical gears 110 which mesh so that the two shafts rotate in opposite directions at the same speed.

The gears 110 are driven by a helical gear 111 which is keyed to a shaft 112, said being journaled in bearings 113 carried by supports 114. The sprocket 6 is keyed to the other end of the shaft 112 so that the gear 111 and the shafts 107 are driven by the chain 5.

Each finger 94 is rigidly connected to a holder 128 which is mounted to slide on a supporting member 129 carried by the member 67. An actuating rod 130 is detachably connected to each holder 128 to reciprocate the same and is mounted to slide through a cylindrical passage in the end portion 131 of the member 129. The rod 130, the holder 128, and the finger 94 are moved manually or by motor means (not shown) between an advanced position shown in solid lines in FIG. 7 and a retracted position shown in dot-dash lines in FIG. 7.

When one of the fingers 94 is moved to the retracted position it moves out of contact with its associated bal 103 so that it no longer transmits vertical movement from the associated ring 104 to the member 101. The eccentricity of said ring 104 is then insufficient to cause vertical reciprocation of the punch unit 95 associated therewith during rotation of the ring. The fingers 94, therefore, permit stopping of the reciprocation of any number of punch units 95 without stopping rotation of the shaft 107. This facilitates formation of the desired perforation pattern.

Each portion 98 has three holes formed therein, each of which receives a spherical ball 117 and a plunger 118 as indicated in FIG. 8. Each plunger has a flat, circular head 119 and a conical bottom surface 120 which engages the ball 117. A series of guide balls 121 engage the cylindrical surface of the plunger 118 to guide the plunger as it is reciprocated. Each plunger 118 is in axial alignment with one of the die blocks 86 as is apparent from FIG. 8 which is drawn substantially to scale. Three spherical balls 123 rest on the flat, upper surface of each head 119. An intermediate member 124 and an upper spherical ball 125 are located in alignment with each ball 123. The elements 123, 124 and 125 are of substantially the same diameter and are adapted to move axially within a cylindrical bore 126 which is coaxial with the die opening 90 as indicated in FIG. 9 which is also drawn to scale. One ball 125 is, therefore, provided for engaging the cutting edge 91 of each die opening 90.

Each punch unit 95 is designed so as to minimize bending stresses on the parts and so as to minimize friction. It will be noted that the center of the large ball 103 is located in a line perpendicular to the surface 97 and through the center of the circle $x$ containing the centers of the three die blocks 86. The centers of the three balls 117 are located in lines perpendicular to the surface 97 which contain the centers of the die blocks 86. The centers of the die openings 90 of each die block 86 are regularly spaced and are located in a circle having its center at the axis of the die block. The centers of the elements 123, 124 and 125 are located at the axis of the bore 126, which axis is perpendicular to the surface 97 and extends through the center of the associated die openings 90. Each body portion 96 has nine bores 126 which are aligned with the nine die openings 90 of the three associated die blocks 86. The arrangement of the parts of each punch unit 95 insures that the same pressure is applied to the sheet material by each of the balls 125 so that all of the perforations are cleanly cut.

The arrangement of the die blocks 83 and their die openings need not interfere with the provision of the desired pattern on the perforated sheet material. FIGS. 10 and 12 indicate the arrangement of these die blocks which will produce the regular pattern shown in FIG. 12. The arrow in this figure indicates direction of flow. As the sheet material passes the first row of punches it is perforated as indicated in the lower portion of FIG. 12.

Each time the punches are reciprocated the sheet material is advanced a distance $d$ equal to twice the axial distance between the die opening 90 at the down-stream end of each die block 86 and the die openings 90 at the up-stream end of that die block. This distance $d$ may be accurately predetermined by adjusting the position of the handle 63 of the Graham drive G.

As the material flows past the second row of punches the remaining portions of the sheet material are perforated so as to complete the perforating operation. The perforated article leaving the machine has the perforations arranged in parallel rows as indicated at the top of FIG. 12. It will be apparent that the pattern may be varied by replacing the die blocks 86 or by changing the setting on the Graham drive. It is, therefore, possible to obtain many different patterns using the same machine.

FIG. 13 illustrates a modified form of the invention which functions generally like the machine shown in FIGS. 1 to 11. The modified machine has a plunger 132 reciprocated by an eccentrically mounted sleeve 104$a$ which functions like the actuating ring 104 described previously. A cylindrical punch sleeve 133 engages the flat bottom surface of the plunger 132 and is mounted for vertical sliding movement in a punch guide 134. The sleeve 133 is shaped to receive a spherical metal ball 135, a cylindrical metal spacer 136, a rubber insert 137, and a cylindrical metal spacer 138, each of these elements having the same outside diameter and being mounted to move vertically with the sleeve 133. The sleeve is internally threaded to receive a screw 139 which holds the elements in place. A lock screw 140 is provided at the end of the sleeve.

A die-receiving block 141 is provided below the punch sleeve 133 and rigidly supports a hard metal die 142 having a small circular opening 143 therein. The lower portion of the die is cut away to provide a large discharge opening 144 which discharges the slugs from the die into the larger discharge opening 145 of the block 141. The sheet material $a$ is guided over the flat upper surface of the die 142 and is engaged by the ball 135, the longitudinal movement of the material causing the ball to rotate so as to minimize the wear on the ball and to reduce the resistance to movement of the sheet material. The central portion of the rubber insert 137 is reduced in diameter to permit reduction on the axial length of the insert so that the insert may take out some of the shock of impact. The sleeve 133 is reciprocated at regularly spaced intervals of time so as to cause the formation of regularly spaced holes in the sheet material when the material is fed at a uniform speed through the machine.

In each of the perforating machines described above suitable means may be provided for lifting the sheet-engaging member (for example the spherical ball) out of contact with the sheet material. This may be accomplished using a leaf spring or other yieldable retracting member, or by positive-acting retraction means, for example of the type disclosed in U.S. Patent No. 2,800,959. When using rotating balls to perforate the material, it is not absolutely necessary to employ such retracting means, since the pressure of the sheet material on the balls is often sufficient to retract the balls. This is possible because of the fact that the balls may remain in contact with the sheet material during feeding of such material without damaging the material. The gravity, of course, helps to retract the balls in a machine of the type shown in FIGS. 1 to 11. It will be apparent, however, that additional retracting means may be provided to facilitate high speed feeding of the sheet material.

The balls may be reciprocated in a satisfactory manner by simple eccentrics of the type disclosed herein, since dragging of the balls on the fabric is not necessarily objectionable. It will be apparent, however, that impact wheels, as shown for example in U.S. Patent No. 2,800,-959, may be employed to reduce the period of contact of the balls with the work between successive cutting strokes. It will also be apparent that means may be provided to compensate for the periodic interruption of the material movement by the balls so that the material feed is speeded up each time the balls release the sheet material. Such compensating means may, for example, be a rubber torsion spring at the feed rolls as described in Patent No. 2,800,959.

When cutting plastic-coated fabric material it is preferable to allow the ball to contact the fabric face of the material and to press the fabric against the plastic since the holes formed in this way are somewhat more attractive. However, such sheet material may be perforated satisfactorily when it is inverted so that the ball originally contacts the plastic and presses the plastic toward the fabric.

The ball perforator of the present invention may be used to perforate conventional uncoated woven fabric material or conventional unreinforced plastic sheet material but performs most efficiently when perforating thin sheets consisting of one layer of woven fabric and one layer of plastic bonded to the fabric (for example sheets of the type disclosed in U.S. Patent No. 2,755,535). The ball perforator also functions effectively with other conventional fabric-reinforced plastic sheet materials of the general type disclosed in U.S. Patent No. 2,332,373; U.S. Patent No. 2,418,904; U.S. Patent No. 2,598,090; U.S. Patent No. 2,700,630; U.S. Patent No. 2,722,495; and U.S. Patent No. 2,787,570.

The operation of the punch and die assembly A will be apparent from the above description. The eccentricity $e$ (FIG. 7) of the actuating ring 104 is preferably no less than the thickness of the sheet material $a$ being perforated and may be several times said thickness. Since the balls 125 rotate to permit movement of the sheet material, it is possible to perforate satisfactorily employing eccentricities which are substantially less than twice the thickness of the material and not substantially greater than said thickness. It is possible for example, to perforate plastic-coated fabric having a thickness of about 0.15 inch with an eccentricity $e$ of only .015 inch. With such an eccentricity, the machine A can effectively perforate sheet material having a thickness anywhere from 0.001 to 0.015 inch without adjustment of the machine.

The present invention is very important since it permits high speed operation (i.e., 500 to 1,000 strokes per minute) without wearing out punches in a short period of time. The performance of rotating balls in a perforating machine is phenomenal. In a test machine, a ball employed to cut plastic sheets has made more than one million hits on the circular cutting edge of a die without noticeable wear on the ball. Standard reciprocating punches do not perform in a comparable manner particularly in high speed perforating machines because of the excessive wear on the punches and dies and the necessity of maintaining perfect alignment between the punches and dies to enable each punch to enter the die opening properly.

The term "punch" is used in the specification and claims in its broad sense to include balls or spherical perforating elements as well as conventional perforating elements.

In the punch and die assembly A the die blocks 86, the perforating elements 125, and other parts are made of hard steels. The intermediate members 124 may be made of steel so that a substantial pressure may be applied against the dies with a small eccentricity for the actuating ring 104. The members 124 may also be made of rubber so as to yield like the rubber members 137 and 154. The eccentricity $e$ of the rings 104 must be greater to accommodate axial compression of the members 124 where the latter members are made of rubber or other compressible material.

The assembly A is preferably constructed so that the block 73 may be moved to facilitate threading of the machine and removed to facilitate removal or replacement of the balls 125 or the die blocks 86. Since the balls 125 are held in their recesses by gravity, it is a simple matter to replace the balls or to remove some of the balls for the purpose of forming special patterns. In the assembly A, however, it is usually preferable to employ all of the balls when operating the machine.

The ability to substitute punches easily and rapidly, in itself, is a very important feature of the invention, since one of the major objections to conventional perforating machines is the high cost of replacing punches. Since the balls employed in the machine of this invention are relatively easy to manufacture, their cost is very low compared to conventional punches and the cost of replacing such balls is much less than the cost of replacing the conventional punches. Furthermore, the balls wear very slowly so that they do not have to be replaced as often as conventional punches.

It is to be understood that the above description is by way of example rather than limitation and that, in accordance with the provisions of the patent statutes, variations and modifications of the specific device disclosed herein may be made without departing from the spirit of the invention.

Having described our invention, we claim:

1. A high speed perforating apparatus comprising a stationary die, an opening in said die having a marginal sheet-engaging edge, a punch sleeve in alignment with the die opening and having a cylindrical bore, means mounting the punch sleeve for movement vertically toward and away from said opening, a work-engaging member mounted in the end portion of said sleeve and having a convex nose portion projecting beyond the sleeve for engaging the edge of the die opening, said nose portion being larger than said opening and receding from its terminus, yieldable means for biasing said work-engaging member toward a normal position at the end of the punch sleeve comprising an axially elongated insert of elastomeric rubber, a first axially elongated rigid member mounted in the bore of said punch sleeve for limited vertical sliding movement relative to said sleeve, said insert being located in said bore between said rigid member and said work-engaging member to bias the rigid member away from the work-engaging member to a normal position in engagement with a rigid portion of the punch sleeve, said insert resisting movement of said rigid member and said work-engaging member out of their normal positions relative to said punch sleeve, a second axially elongated rigid member mounted in the bore of the punch sleeve between said insert and said work-engaging member for vertical sliding movement relative to the punch sleeve, each of said rigid members being in the form of a solid metal cylinder slidably mounted for reciprocation in said bore, and means for reciprocating the punch sleeve at high velocity to cause the nose portion of the work-engaging member to engage the marginal edge of the die opening substantially throughout the perimeter thereof and to pinch off the material between the punch sleeve and the die.

2. A perforating apparatus comprising means for rigidly supporting a series of die blocks in fixed positions, each die block having a series of punch-receiving openings, a first punch guide mounted in a fixed position adjacent said die blocks, a second punch guide mounted in a fixed position against said first guide on the side thereof remote from said die blocks, said second guide having three guide bores therein receiving three plungers and having means for guiding the plungers for straight line reciprocation toward and away from said die blocks, said plungers having equally spaced axes arranged substantially in a predetermined circular cylinder, a spherical ball located in each of said bores of said second guide, each ball engaging the end of one of said plungers remote from said die blocks, a rigid punch member engaging the three balls and mounted for reciprocation toward and away from said guides, means for periodically applying a force to said last-named rigid member along the axis of said circular cylinder to reciprocate said plungers, a multiplicity of small bores in said first punch guide aligned with the openings in said die blocks, three of said small bores being located adjacent each plunger and being arranged with their axes spaced apart equally and located susbtantially in a right circular cylinder having as its axis the axis of said last-named plunger, a work-engaging perforating member mounted in each of said small bores, and means for transmitting reciprocating movement from each plunger to each of the three work-engaging members associated therewith comprising spherical balls in the small bores engaging that plunger, whereby said force is distributed substantially equally to the nine work-engaging members.

References Cited in the file of this patent

UNITED STATES PATENTS

| | | |
|---|---|---|
| 844,171 | McAnulty | Feb. 12, 1907 |
| 1,099,545 | Gabriel | June 9, 1914 |
| 1,180,102 | Avery | Apr. 18, 1916 |
| 1,351,264 | Schumacher | Aug. 31, 1920 |
| 1,401,108 | Griffiths | Dec. 20, 1921 |
| 2,073,194 | Dean | Mar. 9, 1937 |
| 2,272,069 | Raiche | Feb. 3, 1942 |
| 2,361,687 | Hermani | Oct. 31, 1944 |
| 2,749,981 | MacKennon | June 12, 1956 |
| 2,789,639 | Lorentzen | Apr. 23, 1957 |
| 2,792,062 | Pierce | May 14, 1957 |
| 2,857,968 | Cousino | Oct. 28, 1958 |

FOREIGN PATENTS

| | | |
|---|---|---|
| 196,989 | Switzerland | July 16, 1938 |